(12) United States Patent
Navarrete et al.

(10) Patent No.: US 11,551,308 B2
(45) Date of Patent: Jan. 10, 2023

(54) METHODS FOR EVALUATING AND OPTIMIZING PREFERRED PROVIDER ORGANIZATION (PPO) NETWORK STACKS AND DEVICES THEREOF

(71) Applicant: Mitchell International, Inc., San Diego, CA (US)

(72) Inventors: Jonathan Navarrete, San Diego, CA (US); Olaf Wied, San Diego, CA (US); Norman E. Tyrrell, San Diego, CA (US); Laura Spohn, San Diego, CA (US); Lee Haripko, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 405 days.

(21) Appl. No.: 16/750,322

(22) Filed: Jan. 23, 2020

(65) Prior Publication Data

US 2020/0244542 A1    Jul. 30, 2020

Related U.S. Application Data

(60) Provisional application No. 62/798,514, filed on Jan. 30, 2019.

(51) Int. Cl.
*G06Q 40/08* (2012.01)
*G06Q 30/04* (2012.01)
*G06Q 10/10* (2012.01)

(52) U.S. Cl.
CPC ............ *G06Q 40/08* (2013.01); *G06Q 10/10* (2013.01); *G06Q 30/04* (2013.01)

(58) Field of Classification Search
CPC ............... G06Q 10/10; G06Q 30/0201; G06Q 30/0206; G06Q 30/04; G06Q 40/08; H04L 12/1442; H04L 41/14; G06N 3/126
See application file for complete search history.

(56) References Cited

U.S. PATENT DOCUMENTS

2003/0216946 A1\* 11/2003 Ferraro .................. G06Q 40/02
705/4
2009/0076854 A1\* 3/2009 Bigsby .................. G06Q 10/10
705/2

(Continued)

*Primary Examiner* — Robert W Morgan
*Assistant Examiner* — Chance L Smith (57) ABSTRACT

Methods, non-transitory machine readable media, and network stack analysis devices that generate optimized preferred provider organization (PPO) network stacks are disclosed. With this technology, electronic transactions are applied to each of a first plurality of network stacks to determine a cost reduction value for each of the first network stacks. Each of the first network stacks includes an ordered subset of networks. The first network stacks are resampled based on the determined cost reduction values. A determination is made when one or more convergence criteria are met by the resampled first network stacks. When the determination indicates that the convergence criteria are not met by the resampled first network stacks, one or more of the first network stacks are modified based on genetic crossover or mutation operation(s) to generate a second plurality of network stacks. The application, resampling, and determination are then repeated for the second network stacks.

18 Claims, 4 Drawing Sheets

(56) References Cited

U.S. PATENT DOCUMENTS

| | | | |
|---|---|---|---|
| 2011/0153371 A1* | 6/2011 | Lesswing | G06Q 40/04 705/4 |
| 2014/0365236 A1* | 12/2014 | Chaffee | G06Q 10/10 705/2 |
| 2015/0081324 A1* | 3/2015 | Adjaoute | G06Q 40/08 705/2 |
| 2017/0351823 A1* | 12/2017 | Darling | G06Q 40/02 |

* cited by examiner

METHODS FOR EVALUATING AND OPTIMIZING PREFERRED PROVIDER ORGANIZATION (PPO) NETWORK STACKS AND DEVICES THEREOF

This application claims the benefit of U.S. Provisional Patent Application Ser. No. 62/798,514, filed on Jan. 30, 2019, which is hereby incorporated by reference in its entirety

FIELD

This technology generally relates to combinatorial analysis of preferred provider organization (PPO) network stacks utilized for electronic medical bill repricing and, more particularly, to methods and devices for evaluating and optimizing PPO network stacks based on an iterative genetic algorithm.

BACKGROUND

Insurance carriers or payers submit electronic medical bills, often in relatively large batches, for repricing by preferred provider organization (PPO) networks, which are organized or ordered in stacks. Accordingly, an intermediary may receive electronic medical bills from an insurance payer and automatically submit the electronic medical bills as transactions to devices hosted by various PPO networks that can return an indication of whether one or more of the electronic medical bills should be repriced and, if so, an associated amount of the cost savings for the batch of electronic medical bills.

The various PPO networks are ordered in a stack based on particular insurance payer requirements and/or constraints or rules for particular associated jurisdictions (e.g., states). For example, certain PPO networks may operate in only certain jurisdictions or may operate as only primary networks, as opposed to secondary or ancillary networks, in particular jurisdictions. As the transactions flow through a network stack, the savings returned for a particular electronic medical bill is based on the first PPO network in the stack to match certain characteristics of the electronic medical bill (e.g., a procedure code, tax identification number (TIN), or type of bill (TOB)) such that the PPO network is capable of repricing the electronic medical bill.

While some organization of the PPO networks within particular network stacks is dictated by the constraints or rules for the insurance payers and/or jurisdictions, for example, optimizing the remaining available flexibility in the ordering is a combinatorial challenge. There is generally a large number of PPO networks and millions of combinations possible for the ordering of the PPO networks within network stacks. Currently, optimal network stacks for particular insurance payers, for example, are generated based on an automated grid search that analyzes every combination for sample transactions and associated electronic medical bills. However, this is an iterative process that utilizes significant computing resources (e.g., processor cycles), is computationally expensive, inefficient, and time-consuming.

SUMMARY

A method for generating optimized preferred provider organization (PPO) network stacks is disclosed that includes applying, by a network stack analysis device, a batch of electronic transactions to each of a first plurality of network stacks to determine a cost reduction value for each of the first plurality of network stacks. Each of the first plurality of network stacks includes an ordered subset of a plurality of networks. The first plurality of network stacks is then resampled, by the network stack analysis device, based on the determined cost reduction values. A determination is made, by the network stack analysis device, when one or more convergence criteria are met by the resampled first plurality of network stacks. When the determination indicates that the one or more convergence criteria are not met by the resampled first plurality of network stacks, one or more of the first plurality of network stacks are modified, by the network stack analysis device, based on one or more genetic crossover or mutation operations to generate a second plurality of network stacks. The application, resampling, and determination steps are then repeated, by the network stack analysis device, for the second plurality of network stacks.

A network stack analysis device is disclosed that includes memory including programmed instructions stored thereon and one or more processors configured to execute the stored programmed instructions to apply a batch of electronic transactions to each of a first plurality of network stacks to determine a cost reduction value for each of the first plurality of network stacks. Each of the first plurality of network stacks includes an ordered subset of a plurality of networks. The first plurality of network stacks is then resampled based on the determined cost reduction values. A determination is made when one or more convergence criteria are met by the resampled first plurality of network stacks. When the determination indicates that the one or more convergence criteria are not met by the resampled first plurality of network stacks, one or more of the first plurality of network stacks are modified based on one or more genetic crossover or mutation operations to generate a second plurality of network stacks. The application, resampling, and determination steps are then repeated for the second plurality of network stacks.

A non-transitory machine readable medium is disclosed that has stored thereon instructions for optimized PPO network stacks including executable code that, when executed by one or more processors, causes the processors to apply a batch of electronic transactions to each of a first plurality of network stacks to determine a cost reduction value for each of the first plurality of network stacks. Each of the first plurality of network stacks includes an ordered subset of a plurality of networks. The first plurality of network stacks is then resampled based on the determined cost reduction values. A determination is made when one or more convergence criteria are met by the resampled first plurality of network stacks. When the determination indicates that the one or more convergence criteria are not met by the resampled first plurality of network stacks, one or more of the first plurality of network stacks are modified based on one or more genetic crossover or mutation operations to generate a second plurality of network stacks. The application, resampling, and determination steps are then repeated for the second plurality of network stacks.

This technology has a number of associated advantages including providing methods, non-transitory computer readable media, and network stack analysis devices that utilize fewer resources to evaluate and optimize PPO network stacks for processing batched transactions associated with electronic medical bills to be analyzed for repricing. This technology automatically provides a recommended PPO network stack in an efficient, verifiable, and reproducible manner for an insurance payer, for example, based on obtained criteria and jurisdictional constraints and rules. To generate the optimized PPO network stack, this technology advantageously solves a technical combinatorial data analytics problem to provide a practical application of a genetic algorithm that requires fewer computing resources and thereby improves the functioning of network stack analysis devices.

DETAILED DESCRIPTION

Figure 1:
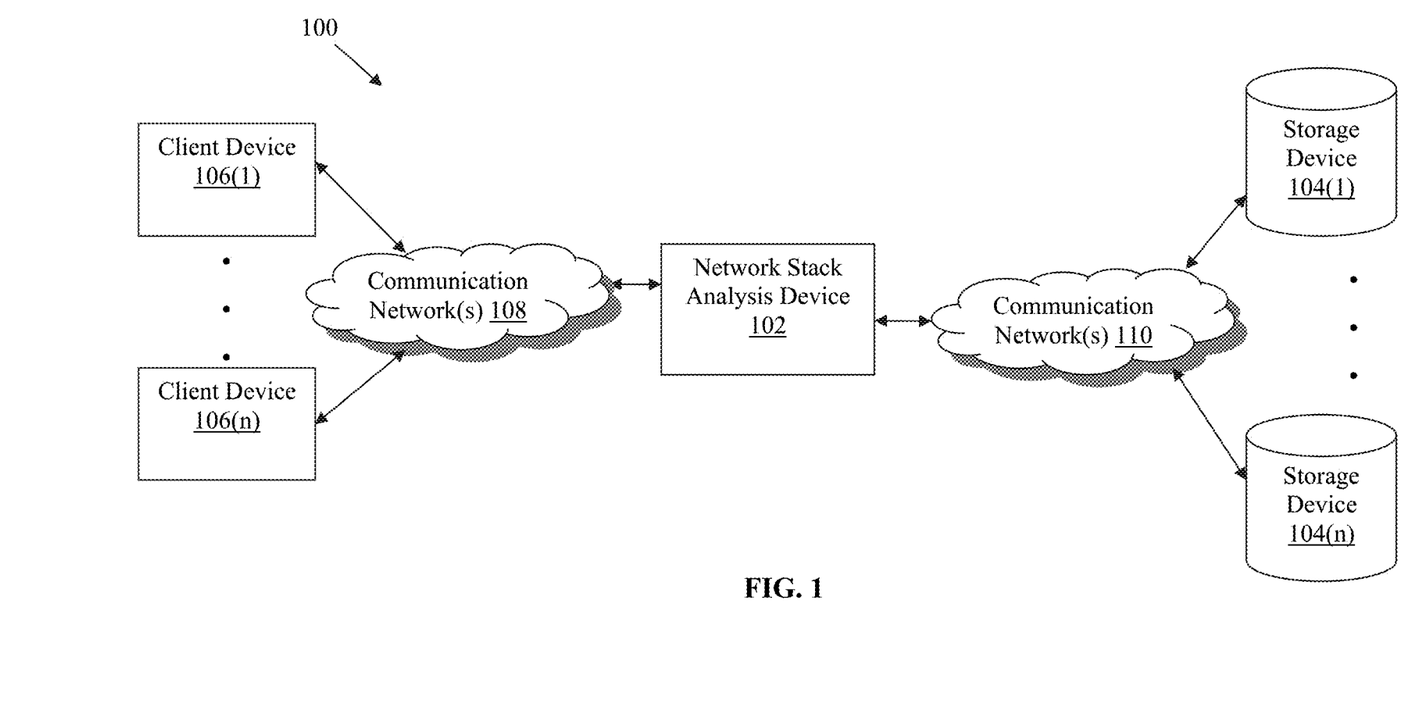
FIG. 1 a block diagram of a network environment with an exemplary network stack analysis device.

Referring to FIG. 1, an exemplary network environment 100 with an exemplary network stack analysis device 102 is illustrated. The network stack analysis device 102 in this example is coupled to a plurality of storage devices 104(1)-104(n) and a plurality of client devices 106(1)-106(n) via communication network(s) 108 and 110, although the network stack analysis device 102, storage devices 104(1)-104(n), and/or client devices 106(1)-106(n), may be coupled together via other topologies. Additionally, the network environment 100 may include other network devices such as one or more routers and/or switches, for example, which are well known in the art and thus will not be described herein. This technology provides a number of advantages and technical improvements including methods, non-transitory computer readable media, and network stack analysis devices that automatically and more efficiently evaluate and optimize preferred provider organization (PPO) network stacks in order to facilitate reduced costs for insurance payers.

Figure 2:
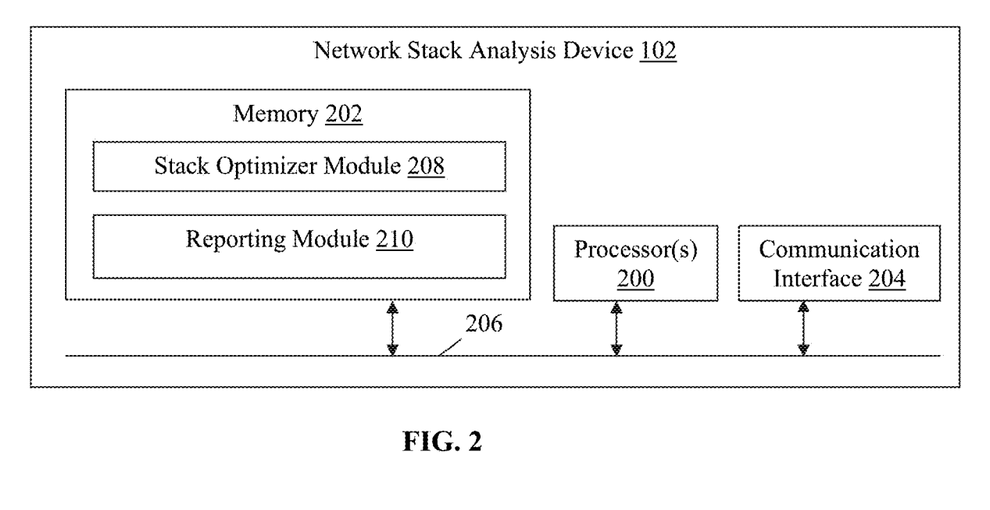
FIG. 2 is a block diagram of the exemplary network stack analysis device of FIG. 1.

Referring to FIGS. 1-2, the network stack analysis device 102 in this example includes one or more processors 200, a memory 202, and/or a communication interface 204, which are coupled together by a bus 206 or other communication link, although the network stack analysis device 102 can include other types and/or numbers of elements in other configurations. The processor(s) 200 of the network stack analysis device 102 may execute programmed instructions stored in the memory 202 for the any number of the functions described and illustrated herein. The processor(s) 200 may include one or more CPUs or general purpose processors with one or more processing cores, for example, although other types of processor(s) can also be used.

The memory 202 of the network stack analysis device 102 stores these programmed instructions for one or more aspects of the present technology as described and illustrated herein, although some or all of the programmed instructions could also be stored elsewhere. A variety of different types of memory storage devices, such as random access memory (RAM), read only memory (ROM), hard disk, solid state drives (SSDs), flash memory, or other computer readable medium which is read from and written to by a magnetic, optical, or other reading and writing system that is coupled to the processor(s) 200, can be used for the memory 202.

Figure 3:
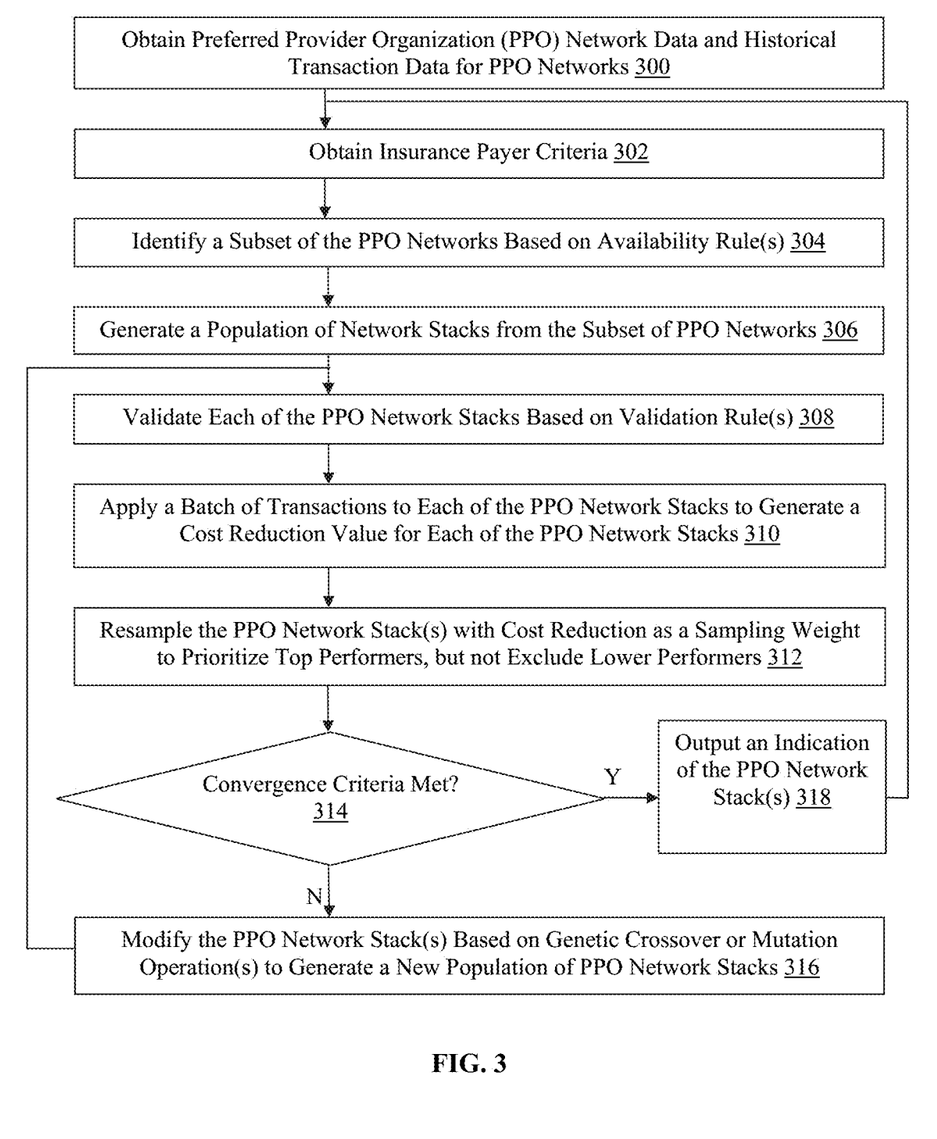
FIG. 3 is a flowchart of an exemplary iterative method for generating optimal preferred provider organization (PPO) network stacks for insurance payers.
Figure 4:
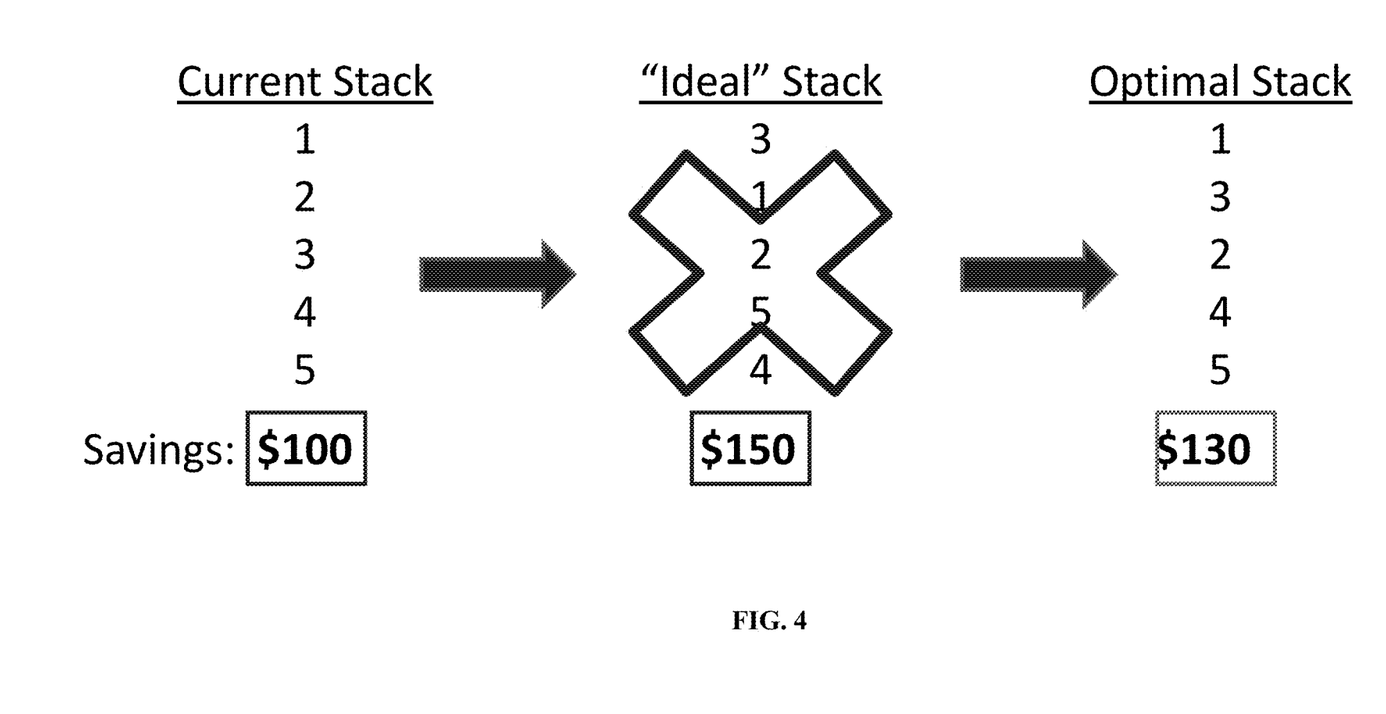
FIG. 4 is an exemplary set of PPO network stacks.

Accordingly, the memory 202 can store application(s) that can include executable instructions that, when executed by the network stack analysis device 102, cause the network stack analysis device 102 to perform actions, such as to transmit, receive, or otherwise process network messages, for example, and to perform other actions described and illustrated below with reference to FIGS. 3-4. The application(s) can be implemented as modules or components of other application(s). Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network stack analysis device 102 itself, may be located in virtual server(s) running in a cloud-based computing environment rather than being tied to one or more specific physical network computing devices. Also, the application(s) may be running in one or more virtual machines (VMs) executing on the network stack analysis device 102. Additionally, in one or more embodiments of this technology, virtual machine(s) running on the network stack analysis device 102 may be managed or supervised by a hypervisor.

In this particular example, the memory 202 of the network stack analysis device 102 includes a stack optimizer module 208 and a reporting module 210, although the memory 202 can include other policies, modules, databases, or applications, for example. The stack optimizer module 208 in this example utilizes PPO network data, historical transaction data for PPO networks, and insurance payer criteria to efficiently generate an optimized, recommended PPO network stack that an insurance payer can use to maximize savings.

Electronic medical bills are submitted to, and flow through, a PPO network stack until the first PPO network is identified that is participating, or has a participating provider, which will reprice the bill in order to realize cost savings. The stack optimizer module 208 applies availability rules based on insurance payer criteria, regulatory criteria, and/or PPO-specific criteria, for example, to identify a population of PPO networks. The stack optimizer module 208 then applies validation rules to PPO network stacks generated from random selections from the population of PPO networks, to validate the generated PPO network stacks.

A batch of transactions (e.g., electronic medical bills) is then submitted to the PPO network stacks and a cost reduction value is generated for each of the PPO network stacks. A genetic algorithm is iteratively applied by the stack optimizer module 208 to provide a technical solution to the technical, combinatorial problem associated with the large number of PPO networks, in order to maximize the cost reduction value, efficiently resulting in an optimal PPO network stack, as described and illustrated in more detail later with reference to FIG. 3.

The reporting module 210 in this example provides visualization tools that facilitate improved consistency, among other advantages. In particular, the reporting module 210 can provide a graphical user interface (GUI) for obtaining insurance payer criteria and providing an indication of recommended PPO network stacks exhibiting maximized cost reduction for particular insurance payers according to the insurance payer criteria (e.g., a particular state jurisdiction).

The communication interface 204 of the network stack analysis device 102 operatively couples and communicates between the network stack analysis device 102, the storage devices 104(1)-104(n), and/or the client devices 106(1)-106(n), which are all coupled together by the communication network(s) 108 and 110, although other types and/or numbers of communication networks or systems with other types and/or numbers of connections and/or configurations to other devices and/or elements can also be used.

By way of example only, the communication network(s) 108 and 110 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 108 and 110 in this example can employ any suitable interface mechanisms and network communication technologies including, for example, Ethernet-based Packet Data Networks (PDNs) and the like.

The network stack analysis device 102 can be a stand-alone device or integrated with one or more other devices or apparatuses, such as one or more of the storage devices 104(1)-104(n), for example. In one particular example, the network stack analysis device 102 can include or be hosted by one of the storage devices 104(1)-106(n), and other arrangements can also be used in other examples.

Each of the storage devices 104(1)-104(n) in this example includes processor(s), a memory, and a communication interface, which are coupled together by a bus or other communication link, although other numbers and/or types of network devices could be used. The communication interface can be used to interface with the network stack analysis device 102 via the communication network(s) 110 in some examples.

The storage devices 104(1)-104(n) in this example host PPO network data and historical transaction data for PPO networks, which can be used to generate a savings rate for each of the PPO networks and a cost reduction value for PPO network stacks that include the PPO networks. The PPO network data can include information associated the PPO networks, such as whether the PPO networks are ancillary/retro/specialty, primary, or non-primary networks, a tax identification number (TIN) list, or a type of bill for which the PPO networks are participating, for example.

Although the storage devices 104(1)-104(n) are illustrated as single devices, one or more actions of the storage devices 104(1)-104(n) may be distributed across one or more distinct network computing devices that together comprise one or more of the storage devices 104(1)-104(n). Moreover, the storage devices 104(1)-104(n) are not limited to a particular configuration. Thus, the storage devices 104(1)-104(n) may contain a plurality of network devices that operate using a master/slave approach, whereby one of the network devices operate to manage and/or otherwise coordinate operations of the other network devices.

The storage devices 104(1)-104(n) may operate as a plurality of network devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 106(1)-106(n) in this example include any type of computing device that can be used by insurance payer users to interface with the network stack analysis device 102 to submit data and/or receive GUI(s). Each of the client devices 106(1)-106(n) in this example includes a processor, a memory, and a communication interface, which are coupled together by a bus or other communication link, although other numbers and/or types of network devices could be used. The client devices 106(1)-106(n) may run interface applications, such as standard web browsers or standalone client applications, which may provide an interface to communicate with the network stack analysis device 102 via the communication network(s) 108. The client devices 106(1)-106(n) may further include a display device, such as a display screen or touchscreen, and/or an input device, such as a keyboard, for example.

Although the exemplary network environment 100 with the network stack analysis device 102, storage devices 104(1)-104(n), client devices 106(1)-106(n), and communication network(s) 108 and 110 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 100, such as the network stack analysis device 102, client devices 106(1)-106(n), or storage devices 104(1)-104(n), for example, may be configured to operate as virtual instances on the same physical machine. In other words, one or more of the network stack analysis device 102, client devices 106(1)-106(n), or storage devices 104(1)-104(n) may operate on the same physical device rather than as separate devices communicating through communication network(s) 108 and 110. Additionally, there may be more or fewer network stack analysis devices 102, client devices 106(1)-106(n), or storage devices 104(1)-104(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only wireless networks, cellular networks, PDNs, the Internet, intranets, and combinations thereof.

The examples may also be embodied as one or more non-transitory computer readable media having instructions stored thereon for one or more aspects of the present technology, such as the memory 202 of the network stack analysis device 102, as described and illustrated by way of the examples herein. The instructions in some examples include executable code that, when executed by one or more processors, such as the processor(s) 200 of the network stack analysis device 102, cause the processors to carry out steps necessary to implement the methods of the examples of this technology that are described and illustrated herein.

An exemplary method for efficiently generating improved and optimized PPO network stacks will now be described with reference to FIGS. 3-4. Referring more specifically to FIG. 3, a flowchart of an exemplary iterative method for generating optimal PPO network stacks for insurance payers is illustrated. In step 300 in this example, the network stack analysis device 102 obtains PPO network data and historical transaction data for PPO networks, optionally from one or more of the storage devices 104(1)-104(n). The PPO network data can include a type (e.g., ancillary or primary), turnaround time, TIN list, or types of bills that can be repriced for each of a plurality of PPO networks, for example, although other types of PPO network data can also be obtained.

The historical transaction data in this example includes information regarding historical medical bills that were submitted to the PPO networks, as well as the provided PPO reduction, if any. The historical transaction data can be maintained as a result of an automated electronic medical bill review process, for example, although other ways of obtaining the historical transaction data can also be used.

In examples in which the PPO network data does not include a savings rate for each of the PPO networks, the historical data is used by the network stack analysis device 102 to generate the savings rates. In particular, the savings rate for a PPO network can be generated based on a ratio of the total PPO reductions for a set of historical electronic medical bills processed or repriced by the PPO network and the total charges associated with the historical medical bills, although other methods of generating the savings rate for each of the PPO networks can also be used in other examples.

In step 302, the network stack analysis device 102 obtains insurance payer criteria, such as from one of the client devices 106(1)-106(n) and via a provided GUI, for example. The insurance payer criteria can include a jurisdiction (e.g., a state), each of which has particular rules and regulations regarding PPO networks, which can operate to limit the available PPO networks. In other examples, the criteria can include one or more of margin, medical bill cost, TIN, turn around time, type of bill, place of service, zip code of service, or current procedural terminology (CPT) code, for example.

In step 304, the network stack analysis device 102 identifies a subset of PPO networks based on stored availability rules. The availability rules can be used to process the insurance payer, regulatory, or PPO criteria against the PPO network data to determine the PPO networks that are available. For example, only a particular subset of PPO networks may have a turn around time that satisfies regulations for a particular state identified in the insurance payer criteria. Based on the application of the availability rules, the network stack analysis device 102 reduces the set of PPO networks to a subset of the PPO networks that could possibly be included in an optimal PPO network stack that satisfies the insurance payer, regulatory, and/or PPO criteria.

In step 306, the network stack analysis device 102 generates a population or set of PPO network stacks. Each of the PPO network stacks includes an ordered plurality of PPO networks selected from the subset of the PPO networks determined in step 304 to be available. Optionally, the PPO networks are randomly selected for one or more of the PPO network stacks in the population, although other selection processes can also be used in other examples.

In step 308, the network stack analysis device 102 validates each of the PPO network stacks in the population generated in step 306 based on one or more stored validation rules. The validation rules dictate at least the ordering for the PPO networks within a particular PPO network stack, although other features of the PPO network stacks can also be constrained based on the validation rules. Referring more specifically to FIG. 4, an exemplary set of PPO network stacks is illustrated. In this example, the cost reduction value for the current PPO network stack that an insurance payer may be using, based on processing a set of electronic medical bills, is $100. An ideal PPO network stack would include PPO networks in a "31254" order, which would result in a cost reduction value of $150.

However, in this example, the validation rules dictate that PPO network 1 must be first and PPO network 4 must be above or earlier than PPO network 5. Based on the application of the validation rules, the network stack analysis device would reject the ideal PPO network stack in this example. One of the remaining, validated PPO network stacks may be ordered "13245", which results in a cost reduction value of $130 and is determined to be optimal in this example based on a processing of all of the remaining, validated PPO network stacks, such as according to steps 310-318 of FIG. 3 as described in more detail below.

Referring specifically to step 310, the network stack analysis device 102 applies a batch of transactions (e.g., electronic medical bills) to each of the PPO network stacks validated in step 308 to generate a cost reduction value for each of the PPO network stacks in order to evaluate the fitness of each of the PPO network stacks. The network stack analysis device in this example applies each electronic medical bill to each of the PPO network stacks to determine which PPO network(s), if any, will reprice the electronic medical bill. The determination can be based on a match of characteristics of the electronic medical bill with obtained PPO network data associated with the PPO network(s), for example.

In one particular example, the TIN of an electronic medical bill may match a TIN working list in PPO network data associated with an ancillary PPO network. In another example, the type of electronic medical bill may match a type of bill indicated in PPO network data as being processed by a particular primary PPO network. Other types of characteristics and matches can be used to determine whether a PPO network will provide a PPO reduction or repricing for a particular electronic medical bill in the batch.

If the network stack analysis device 102 determines that one of the PPO networks in a particular PPO network stack will reprice a current electronic medical bill, then the network stack analysis device increments the cost reduction value for the PPO network stack based on an estimated cost savings for the electronic medical bill. The estimated cost savings for the medical bill can be determined by multiplying the savings rate, obtained or determined for the PPO network as described in more detail earlier with reference to step 300, by the charge associated with the electronic medical bill.

Accordingly, in step 310, a batch of electronic medical bills automatically flows through the ordered PPO networks in each of the PPO network stacks in the population generated in step 306 that were validated in step 308. A cost reduction value is generated by the network stack analysis device 102 for each of the PPO network stacks based on savings rates for the first encountered PPO networks that will reprice each of the electronic medical bills, if any. The cost reduction values represent the fitness of each of the PPO network stacks. Optionally, the same batch of transactions is applied to each of the PPO network stacks for consistency, although different batches of transactions can also be used in other examples.

In step 312, the network stack analysis device 102 resamples the PPO network stacks using the cost reduction value as a sampling weight in order to prioritize higher performers, but not exclude lower performers. Accordingly, the PPO network stacks are resampled based on fitness, which is represented by the cost reduction value in this example, such that relatively fit PPO network stacks (i.e., PPO network stacks with the greatest cost reduction values) are prioritized.

In step 314, the network stack analysis device 102 determines whether one or more convergence criteria are met by the resampled PPO network stacks. In this example, convergence criteria are satisfied when there is no significant improvement in fitness from one generation to the next. The significance of the improvement can be configurable and can be static or dynamic. The resampled PPO network stacks represent "parents" for a next generation of the genetic algorithm in this example. Accordingly, in a first iteration, the convergence criteria will not be met and the network stack analysis device 102 will take the No branch to step 316.

In step 316, the network stack analysis device 102 modifies the PPO network stacks resampled in step 312 based on genetic crossover or mutation operation(s) to generate a new population of "children" PPO network stacks. Accordingly, the resampled PPO networks stacks are adjusted to remove, replace, or reorder one or more PPO networks, for example, and other types of modifications can also be used in other examples. Subsequent to modifying the PPO network stacks, the network stack analysis device 102 proceeds back to step 308, and steps 308-314 are repeated in a subsequent iteration. By way of example, this iterative evaluation of PPO network stacks using a genetic algorithm is not well understood, routine, or conventional in the prior art and facilitates a practical application of this technology that provides optimal, validated PPO network stacks for insurance payers for automated processing of electronic medical bills.

Referring back to step 314, if the network stack analysis device determines that the convergence criteria are met in a subsequent iteration, then the Yes branch is taken to step 318. In step 318, the network stack analysis device 102 outputs an indication of the PPO network stack(s), such as to the one of the client devices 106(1)-106(n) from which the insurance payer criteria was obtained in step 302. Optionally, the most fit remaining network stack is output in examples in which more than one resampled PPO network stack remains after satisfaction of the convergence criteria, although any number of the PPO network stacks can be provided in other examples. The output PPO network stack in this example represents a recommended network stack for achieving the greatest cost reduction for medical bills associated with claimants based on the insurance payer criteria.

Subsequent to outputting the indication of the PPO network stack in step 318, the network stack analysis device 102 proceeds back to step 302 in this example and again obtains insurance payer criteria for the same or a different one of the client devices 106(1)-106(n). In other examples, one or more of steps 300-318 can be performed by the network stack analysis device 102 in a different order and/or in parallel.

As illustrated and described by way of the examples herein, this technology more efficiently generates a global optimal PPO network stack for an insurance payer for a particular state or other criteria based on an evaluation of PPO network cost savings potential. With this technology, bias against particular PPO networks, which may be ordered lower within PPO network stacks, due to a relatively low bill count, is removed to provide a more consistent evaluation of PPO networks. Accordingly, this technology automatically provides a recommended PPO network stack in an efficient, verifiable, and reproducible manner across any number of insurance payers based on obtained criteria. The functioning of the network stack analysis device is advantageously improved with this technology, which uses fewer resources, including memory and processor cycles, as compared to carrying out a grid search to identify an optimal PPO network stack for a particular insurance payer, for example.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating optimized preferred provider organization (PPO) network stacks, the method comprising:
   applying, by a network stack analysis device, a batch of electronic transactions to each PPO listed in a first PPO network stack;
   determining, by the network stack analysis device, a cost reduction value for each PPO network in the first PPO network stack, wherein the first PPO network stack comprises an ordered subset of a plurality of PPO networks that include a primary PPO network and one or more secondary or ancillary PPO networks that individually operate to review electronic medical bills;
   based on the determined cost reduction values for each PPO in the first PPO network stack, resampling, by the network stack analysis device, the first PPO network stack to generate a second ordered subset of the plurality of PPO networks that prioritize higher performer PPO networks in the ordered subset; and
   in response to determining that one or more convergence criteria are not met by the second ordered subset of the plurality of PPO networks:
      modifying, by the network stack analysis device, the first PPO network stack based on one or more genetic crossover or mutation operations to generate a second PPO network stack that comprises a third ordered subset of the plurality of PPO networks; and
      iteratively repeating, by the network stack analysis device, the applying, first determining, resampling, and second determining for the second PPO network stack.

2. The method of claim 1, further comprising outputting, by the network stack analysis device, the first PPO network stack to facilitate an optimal evaluation of another batch of electronic transactions associated with the electronic medical bills to be analyzed for repricing, when the determination indicates that the one or more convergence criteria are met by the first PPO network stack.

3. The method of claim 1, further comprising applying, by the network stack analysis device, one or more stored availability rules to obtained PPO network data for each of the plurality of networks, and obtained insurance payer, regulatory, or PPO criteria, to identify the ordered subset of the plurality of PPO networks for each of the first PPO network stack.

4. The method of claim 1, further comprising validating, by the network stack analysis device, each of the first PPO network stack based on one or more stored validation rules prior to the applying of the batch of electronic transactions to each of the first PPO network stack.

5. The method of claim 1, wherein the batch of electronic transactions comprises a plurality of electronic medical bills and the method further comprises determining, by the network stack analysis device, a savings rate for each of the plurality of PPO networks based on one or more types of the plurality of electronic medical bills that can be repriced and obtained historical transaction data associated with each of the plurality of PPO networks.

6. The method of claim 5, wherein the determined cost reduction value for each of the first PPO network stack is further based on a flow of each of the batch of electronic transactions through each of the first PPO network stack, the savings rate for one or more of the plurality of PPO networks associated with each of the first PPO network stack, and one or more charges associated with each of the batch of electronic transactions.

7. A network stack analysis device, comprising memory comprising programmed instructions stored thereon and one or more processors configured to execute the stored programmed instructions to:
 apply a batch of electronic transactions to each PPO listed in a first PPO network stack;
 determine a cost reduction value for each PPO network in the first PPO network stack, wherein the first PPO network stack comprises an ordered subset of a plurality of PPO networks that include a primary PPO network and one or more secondary or ancillary PPO networks that individually operate to review electronic medical bills;
 based on the determined cost reduction values for each PPO in the first PPO network stack, resample the first PPO network stack to generate a second ordered subset of the plurality of PPO networks that prioritize higher performer PPO networks in the ordered subset; and
 in response to determining that one or more convergence criteria are not met by the second ordered subset of the plurality of PPO networks:
  modify the first PPO network stack based on one or more genetic crossover or mutation operations to generate a second PPO network stack that comprises a third ordered subset of the plurality of PPO networks; and
  iteratively repeat the applying, first determining, resampling, and second determining for the second PPO network stack.

8. The network stack analysis device of claim 7, wherein the one or more processors are further configured to execute the stored programmed instructions to output the first PPO network stack to facilitate an optimal evaluation of another batch of electronic transactions associated with the electronic medical bills to be analyzed for repricing, when the determination indicates that the one or more convergence criteria are met by the first PPO network stack.

9. The network stack analysis device of claim 7, wherein the one or more processors are further configured to execute the stored programmed instructions to apply one or more stored availability rules to obtained PPO network data for each of the plurality of 20 networks, and obtained insurance payer, regulatory, or PPO criteria, to identify the ordered subset of the plurality of networks for each of the first PPO network stack.

10. The network stack analysis device of claim 7, wherein the one or more processors are further configured to execute the stored programmed instructions to validate each of the first PPO network stack based on one or more stored validation rules prior to the applying of the batch of electronic transactions to each of the first PPO network stack.

11. The network stack analysis device of claim 7, wherein the batch of electronic transactions comprises a plurality of electronic medical bills and the one or more processors are further configured to execute the stored programmed instructions to determine a savings rate for each of the plurality of PPO networks based on one or more types of the plurality of electronic medical bills that can be repriced and obtained historical transaction data associated with each of the plurality of PPO networks.

12. The network stack analysis device of claim 11, wherein the determined cost reduction value for each of the first PPO network stack is further based on a flow of each of the batch of electronic transactions through each of the first PPO network stack, the savings rate for one or more of the plurality of PPO networks associated with each of the first PPO network stack, and one or more charges associated with each of the batch of electronic transactions.

13. A non-transitory machine readable medium having stored thereon instructions for generating optimized preferred provider organization (PPO) network stacks comprising executable code that, when executed by one or more processors, causes the one or more processors to:
 apply a batch of electronic transactions to each PPO listed in a first PPO network stack;
 determine a cost reduction value for each wherein each PPO network in the first PPO network stack, wherein the first PPO network stack comprises an ordered subset of a plurality of PPO networks that include a primary PPO network and one or more secondary or ancillary PPO networks that individually operate to review electronic medical bills;
 based on the determined cost reduction values for each PPO in the first PPO network stack, resample the first PPO network stack to generate a second ordered subset of the plurality of PPO networks that prioritize higher performer PPO networks in the ordered subset stacks; and
 in response to determining that one or more convergence criteria are not met by the second ordered subset of the plurality of PPO networks:
  modify the first PPO network stack based on one or more genetic crossover or mutation operations to generate a second PPO network stack that comprises a third ordered subset of the plurality of PPO networks; and
  iteratively repeat the applying, first determining, resampling, and second determining for the second PPO network stack.

14. The non-transitory machine readable medium of claim 13, wherein the executable code, when executed by the processors, further causes the processors to output the first PPO network stack to facilitate an optimal evaluation of another batch of electronic transactions associated with the electronic medical bills to be analyzed for repricing, when the determination indicates that the one or more convergence criteria are met by the first PPO network stack.

15. The non-transitory machine readable medium of claim 13, wherein the executable code, when executed by the processors, further causes the processors to apply one or more stored availability rules to obtained PPO network data for each of the plurality of networks, and obtained insurance payer, regulatory, or PPO criteria, to identify the ordered subset of the plurality of PPO networks for each of the first PPO network stack.

16. The non-transitory machine readable medium of claim 13, wherein the executable code, when executed by the processors, further causes the processors to validate each of the first PPO network stack based on one or more stored validation rules prior to the applying of the batch of electronic transactions to each of the first PPO network stack.

17. The non-transitory machine readable medium of claim 13, wherein the batch of electronic transactions comprises a plurality of electronic medical bills and the executable code, when executed by the processors, further causes the processors to determine a savings rate for each of the plurality of PPO networks based on one or more types of the plurality of electronic medical bills that can be repriced and obtained historical transaction data associated with each of the plurality of PPO networks.

18. The non-transitory machine readable medium of claim 17, wherein the determined cost reduction value for each of the first PPO network stack is further based on a flow of each of the batch of electronic transactions through each of the first PPO network stack, the savings rate for one or more of the plurality of PPO networks associated with each of the first PPO network stack, and one or more charges associated with each of the batch of electronic transactions.

* * * * *

UNITED STATES PATENT AND TRADEMARK OFFICE
CERTIFICATE OF CORRECTION

PATENT NO. : 11,551,308 B2
APPLICATION NO. : 16/750322
DATED : January 10, 2023
INVENTOR(S) : Jonathan Navarrete et al.

It is certified that error appears in the above-identified patent and that said Letters Patent is hereby corrected as shown below:

In the Claims

Column 12, Line 30 (Claim 13, Line 19) that reads "ordered subset stacks; and" to -- ordered subset; and --

Signed and Sealed this
Twenty-eighth Day of March, 2023

Katherine Kelly Vidal
*Director of the United States Patent and Trademark Office*